United States Patent [19]

Moriyama et al.

[11] Patent Number: 5,484,560
[45] Date of Patent: Jan. 16, 1996

[54] METHOD FOR TREATING SURFACE OF THERMOPLASTIC RESIN ARTICLE

[75] Inventors: Makoto Moriyama; Kouichi Kuwano, both of Osaka; Ikuo Tochizawa, Hyogo, all of Japan

[73] Assignee: Nippon Paint Co., Ltd., Osaka, Japan

[21] Appl. No.: 378,769

[22] Filed: Jan. 26, 1995

Related U.S. Application Data

[63] Continuation of Ser. No. 125,169, Sep. 23, 1993, abandoned.

[30] Foreign Application Priority Data

Sep. 24, 1992 [JP] Japan .................... 4-255070

[51] Int. Cl.⁶ .................... B29C 71/02; B29C 71/04
[52] U.S. Cl. .................... 264/483; 264/132; 264/233; 264/234; 264/345; 427/536; 427/322
[58] Field of Search .................... 264/22, 25, 132, 264/230, 234, 235, 345, 346, 233; 427/534, 536, 322

[56] References Cited

U.S. PATENT DOCUMENTS

| | | |
|---|---|---|
| 2,632,921 | 3/1953 | Kreidl . |
| 3,555,135 | 1/1971 | Paul .................... 264/230 |
| 4,339,303 | 7/1982 | Frisch et al. .................... 264/22 |
| 4,868,006 | 9/1989 | Yorkgitis et al. . |
| 4,933,123 | 6/1990 | Yoshida et al. .................... 264/25 |
| 5,259,999 | 11/1993 | Iwakiri et al. .................... 264/25 |
| 5,273,789 | 12/1993 | Shinonaga et al. .................... 264/25 |

FOREIGN PATENT DOCUMENTS

| | | |
|---|---|---|
| 0103993 | 3/1984 | European Pat. Off. . |
| 57-138994 | 8/1982 | Japan .................... 264/25 |
| 59-221336 | 12/1984 | Japan . |
| 61-151244 | 7/1986 | Japan . |

OTHER PUBLICATIONS

Patent Abstracts of Japan, vol. 003, No. 075, (C–050) 27 Jun. 1979, & JP–A–54 052 176 (Mitsuibishi Petroleum Co. Ltd.) 24 Apr. 1979.

Database WPI–Derwent Publications Ltd., London, GB; AN 80–85431C[48] & JP–A–55 133 959 (Honshu Paper Mfg. KK.) 19 Oct. 1980.

Patent Abstracts of Japan, vol. 008, No. 085, (C–219) 18 Apr. 1984, & JP–A–59 004 627 (Nihon Ita Glass KK.) 11 Jan. 1984.

Patent Abstracts of Japan, vol. 010, No. 350, (C–387) 26 Nov. 1986 & JP–A–61 151 244 (Isuzu Motors Ltd.) 9 Jul. 1986.

Derwent Publications Ltd., London, GB; AN 91–337160 [46] & JP–A–3 227 619 (Toppan Printing KK.) 8 Oct. 1991.

*Primary Examiner*—Mathieu D. Vargot
*Attorney, Agent, or Firm*—Armstrong, Westerman, Hattori, McLeland & Naughton

[57] ABSTRACT

A method which includes enhancing effects upon treating the surface of a thermoplastic resin article by a surface-activating treatment such as corona discharge and the like or by a primer treatment and, thereby, improving coating performance, printability, adhesiveness and so forth of the thermoplastic resin article. The resin article is subjected to a surface-heating treatment which comprises heating only surface layer of the resin article up to a melting point of the thermoplastic resin or a higher temperature followed by cooling the surface layer, and then, subjected to the surface-activating treatment or primer coating.

12 Claims, 5 Drawing Sheets

METHOD FOR TREATING SURFACE OF THERMOPLASTIC RESIN ARTICLE

This application is a continuation of application Ser. No. 08/125,169 filed Sep. 23, 1993, now abandoned.

BACKGROUND OF THE INVENTION

The present invention relates to a method for treating the surface of a thermoplastic resin article and, in detail, relates to a surface-treating method for improving coating performance, printability, adhesiveness and the like, when a molded article having a three-dimensional shape, made by injection molding and the like, or a sheet type article, made by extrusion molding and the like, is subjected to a coating process, a printing process, or a process of adhering it to another article.

Hitherto, as for a surface-treating method for improving coating performance, printability, adhesiveness and the like of a thermoplastic resin article there is a method, such as a corona discharge treatment, a plasma treatment, an ultraviolet-irradiation treatment and the like, which comprises forming active species on a surface of said resin article and, by an action of the active species, improving bonding performance with a coating, ink, an adhesive and the like. In addition, there is a method for improving the bonding performance by applying a primer (an undercoating) before applying a coating and the like.

Improving effects of the aforementioned various kinds of activation treatments or the primer treatment upon coating performance and the like are very much affected by surface conditions of a resin article to be treated.

Practically, when a resin article is molded, an antioxidant, a plasticizer or the like contained in the resin article bleeds out on the resin article surface to deteriorate conditions of the resin article surface. In some cases, a mold-release agent or an anticorrosive oil may attach to the resin article surface and damage conditions of the resin article surface. In case of using a metal mold for injection molding and the like, when the mold is released, microscopically fine flaws may be given to the resin article surface and said flaws may deteriorate conditions of the resin article surface. In molding a resin article according to the aforementioned, a part of the resin article surface, of which performance is inferior to that of other parts, may be called WBL (Weak Boundary Layer).

Also, after a resin article has been molded, while storing or handling to transport it, there is a case where the surface becomes dirty or suffers flaws due to a touch with others, so that surface conditions of the part becomes bad. Concretely, for example, when a resin article is transferred by a conveyor and the like, there is a possibility that the resin article suffers flaws or becomes dirty due to a contact with a roller or a guide. Also, there are many cases where a sheet article having a certain extent of thickness is stored or handled under piled conditions and where a relatively thin film article is handled under wound conditions. In any of the cases, the article surfaces are apt to suffer flaws resulting from touching with each other. Furthermore, when the resin article surface is cleaned or washed, a brush roller and the like occasionally give flaws.

Especially, in case of an article molded by injection molding, burrs are occasionally formed at a periphery part, a hole part or other parts of the molded article. To repair the part, an operation to remove the burrs by sand paper of about #800 to #1200 is carried out, and traces by this sanding causes problem similar to that by said flaws and the like and poor adhesion may occur.

In case that there is said WBL part being formed in molding the resin article or that there are flaws, dirt, sanding traces or the like being formed in the course of handling the resin article, even if an activation treatment, such as a corona discharge treatment and the like, or a primer treatment is carried out, treatment effects are not sufficiently obtained and bonding performance in coating or printing being applied after said treatment become poor.

Accordingly, there have been proposed various methods for further improving coating performance and the like of the resin article by improving effects of such a treatment as a corona discharge and the like.

For example, in Japanese Official Patent Provisional Publication No. showa 61-151244 there has been proposed a method which comprises, before the plasma treatment, carrying out heating by blowing a hot wind or by using an oven, or carrying out high pressure air-blowing, to remove a solvent remaining on the surface of a molded resin article.

In Japanese Official Patent Provisional Publication No. showa 59-221336 there has been disclosed a method which comprises treating by low temperature plasma under conditions where a thermoplastic resin is heated at its melting or softening point or at a higher temperature to improve effects of the low temperature plasma treatment, and thereby, improving coating performance, printability and the like of the thermoplastic resin.

On the other hand, it is typical to carry out a primer treatment before applying the coating or printing to a thermoplastic resin article. Hitherto, as the primer treatment in many cases, a washing treatment by a chlorine-based solvent such as trichloroethane is carried out before coating a primer. The washing treatment by a chlorine-based solvent is said to improve effects of the primer treatment more than, for example, a washing treatment by a water base washing agent.

Also, it proves that, if a washing agent similar to the above-mentioned which comprises a chlorine-based solvent including trichloroethane and the like is used before applying a corona discharge treatment or the like to a thermoplastic resin article, there are some cases where effects of treatment such as corona discharge and the like are enhanced.

However, any one of the aforementioned conventional methods could not sufficiently improve effects of such a treatment as corona discharge and the like.

For example, according to a method in the Japanese Official Patent Provisional Publication No. showa 61-151244, a solvent and the like which have attached to or been impregnated into the surface of a molded resin article can be removed to some extent. However, there cannot be solved the defects of surface conditions resulting from flows or sanding traces on the surface or from internal constitution of the molded resin article surface or from a surface structure itself.

According to a method of the Japanese Official Patent Provisional Publication No. showa 59-221336, since active species formed on the surface of a thermoplastic resin by contact with plasma is taken into an inside of the resin which is in a fluid condition by heating to melt it, active species remaining on the resin surface after the resin being cooled and solidified are in many cases merely a part of active species formed by the plasma, so that effects of the plasma treatment are diminished. The defect in this method is also found in the case where a thermoplastic resin article, for example, a film is treated by extrusion molding and, before this film being cooled and solidified and under a surface-melted condition, it is subjected to corona discharge.

Next, since it is inferred that the environment may be destroyed by using a washing agent containing a chlorine-based solvent, such as trichloroethane, flon and the like, as a washing agent for a pre-washing process in the primer treatment, use of a washing agent for the primer treatment has been required to discontinue it. If a water base washing agent is used, the problem relating to the environment is only a few. However, a problem for the water base washing agent is that attaining sufficient effects of the primer treatment is difficult and improving effects on the coating performance or printability are insufficient. An entirely similar problem is found in the case where washing treatment being performed before corona discharge and the like is carried out by using a water base washing agent in place of a washing agent comprising a chlorine-based or non-chlorine-based solvent.

SUMMARY OF THE INVENTION

Accordingly, it is an object of the present invention to provide a method which comprises, on a surface of a thermoplastic resin article to be treated with a surface-activating treatment such as a corona discharge treatment and the like or treated with a primer treatment, enhancing effects of these treatments and improving coating performance, printability, adhesiveness or the like of the resin article. Also, it is another object of the present invention to provide a method which comprises, even if a washing agent comprising a chlorine-based solvent such as trichloroethane, flon and the like conventionally used as a washing agent for the primer treatment is not used, displaying effects of said corona discharge or primer treatment well and improving coating performance, printability, adhesiveness or the like of the resin article.

To solve the above-mentioned problems, a method of the present invention for treating a surface of a thermoplastic resin article comprises:

carrying out for the resin article a surface-heating treatment, which comprises heating only a surface layer of the resin article up to a melting point of the thermoplastic resin or a higher temperature followed by cooling the surface layer, and further carrying out for the resin article a surface-activating treatment or primer-coating.

The thermoplastic resin article to which the present invention is applied comprises those composed of a polyolefin type resin, such as polypropylene, polyethylene and the like, or another conventional thermoplastic resin. The above-mentioned thermoplastic resin may comprise either a homopolymer or a copolymer. For example, it may either comprise solely the above-mentioned polyolefin type resin or contain a rubber component, such as EPR, nylon or the like. For the resin article there is used such as having an optional shape molded by the injection molding, extrusion molding or other conventional molding methods. The resin article may be a molded article having a three-dimensional shape, or a plate type, sheet type or film type article. Although the term "sheet" or "film" is used in some cases on the standard of thickness, however, in the present specification, the term "sheet type article" is used in a sense of including both of a so-called sheet and film.

A surface-heating treatment is such as comprising heating only an underlying thin resin layer just below the surface of the resin article, that is, only a surface layer, up to a melting point of the thermoplastic resin or a higher temperature followed by cooling the treated resin. Color, luster or gloss on a surface of the resin article changes because of the above-mentioned heating. This change usually results from that the surface layer of the resin is softened or melted by the heating treatment. It is preferable that thickness of a surface layer to be heated is as thin as possible if it is in a range where effects of a surface-activating treatment of a post-process can be improved well. If the thickness of a surface layer to be heated and melted is too thick, the resin article unpreferably changes its shape or its surface conditions unpreferably change.

For a practical means of a surface-heating treatment there can be optionally adopted a known means of heating, as far as it is a method by which such heating of only a surface layer as the above-mentioned can be efficiently carried out. For example, a method of blowing a hot wind onto the resin article surface is preferable. Also, irradiation of far-infrared rays can be adopted. Furthermore, these methods can be jointly used. However, in the surface-heating treatment, only a surface layer of the resin article is heated, and heating must not be carried out to such an extent that the resin thermally decomposes. Also, in the surface-heating treatment, it is preferable to heat the resin article up to a melting temperature within a short time and, furthermore in cooling, to cool the resin article to a solidifying temperature within a short time. If the resin article is held at a relatively high temperature, which is equal to or lower than its reel ting point, for a long period of time, there occurs a problem that a low molecular weight component in an inside of the resin bleeds out, so that the purpose of a surface-heating treatment is impeded.

In the case of blowing a hot wind, it is preferable to use a hot wind having a temperature higher than a melting point of the resin article by 30° to 450° C. More preferably, a hot wind having a temperature higher than a melting point of the resin article by 80° to 350° C. is used. A preferable wind speed of the hot wind is in a range of 1 to 40 m/sec, more preferably in a range of 5 to 30 m/sec. A preferable time for the hot wind-blowing treatment is in a range of 0.5 to 20 seconds, more preferably in a range of 1 to 10 seconds. Usually, these treating conditions are not such as can be selected independently, but they have relation of restricting each other. The relation like this occasionally varies, for example, according to the thickness, shape or the like of the resin article. One example of the relation is illustrated by FIG. 5. Preferable treating conditions are in a range shown by a shaded portion in FIG. 5. If the treating temperature is low, a long treating time is required and, if the treating temperature is high, a short treating time is enough. If conditions below the range are selected, the treatment is generally insufficient and, if conditions above the range are selected, the treatment progresses too much, so that the resin over-melts (excessively melts). For example, in case of a bumper of which average thickness is 3.0 mm and minimum thickness is 1 mm, over-melting occurs at a part of the minimum thickness to cause a change of the shape. It is interesting that, in case where the treating temperature is low, width of the allowable treating time is narrow and that, in case where the treating temperature is high, a width of the allowable treating time is broad, in other words, in case where the treating temperature is high, a range of the treating time to be selected becomes broad.

The surface-heating treatment may be carried out either on the whole surface of the resin article or only at a part of a surface of the resin article having a surface defect such as flaws, sanding traces and the like. In case of carrying out a surface-heating treatment on the whole surface of the resin article, a treating apparatus of a fixed setting type is used. However, in case of carrying out partially the surface-heating treatment on the resin article surface, a treating apparatus of a transportable type or mobile type, such as a hot wind-generator of a portable type and the like, can be used.

For the resin article to be subjected to a surface-heating treatment there is used a resin article which has been sufficiently cooled and solidified after molding. Even if the surface-heating treatment is carried out for a resin article which has not yet been cooled and solidified after molding, aimed operation effects are not attained. The resin article, which has been sufficiently cooled and solidified immediately after molding, may be either subjected to a surface-heating treatment or subjected to various kinds of handling operations before carrying out a surface-heating treatment. As the handling operations, the resin article molded may be subjected to handling for transportation and storing, the resin article surface may be cleaned or washed, or mechanical processing may be carried out.

After a surface layer of the resin article heated and melted by a surface-heating treatment is sufficiently cooled and solidified, a subsequent process is carried out. The surface layer of the resin article needs to be cooled at least to its melting point or a lower temperature. Cooling and solidifying of the resin article can be attained only by allowing it to radiate heat into the air. However, there can be also carried out compulsive cooling by blowing a cold wind to the resin article or by bringing it into contact with a refrigerant.

In case where the resin article is a sheet type article, there can be applied a method which comprises heating one side of the sheet type article and cooling compulsively its reverse side. If only the one side is heated in applying the method, heating and melting of the article inside which may occur with those of the article surface layer is prevented, so that only the surface layer on said one side can well be heated for reel ting. Also, if heating stopped after said one side being completely heated for melting, the reverse side which has been compulsively cooled takes out heat from said one side, so that said one side is rapidly cooled and solidified. Such a method of simultaneously carrying out heating and compulsive cooling is preferably applied to a sheet type article of about 2 mm or less in thickness.

In case where the resin article is a vessel type molded article, if the surface-heating treatment is carried out under conditions where a liquid is filled in an inside of the vessel type molded article, there can be efficiently carried out cooling and solidifying after the heating and melting. In the case where the vessel type molded article is such as being used or sold in a condition of filling a liquid in the inside, if a surface-heating treatment is carried out after filling a liquid to be used or sold, a labor to use another liquid for cooling is omitted. For practical examples of the vessel type molded article to fill the liquid and sell, there are cited packing vessels for oil, a detergent, an alcoholic drink, a juice and the like.

In case of carrying out a washing treatment before the surface-heating treatment for the resin article, there can be used a conventional washing agent which is used for degreasing-washing of a common resin article and other washing. For practical methods for the washing treatment there can be applied vapor-washing comprising using vapor of a washing agent; immersion-washing comprising immersing the resin article in a washing agent; spray washing comprising spraying a washing agent; and other conventional washing treatment. By the washing treatment there can be removed dirt or defects in surface conditions which cannot be removed by only the surface-heating treatment. In the washing treatment, it is desired to arrange as flawless as possible. However, even if flaws are formed by using a brush roll and the like which have been so far commonly used, the flaws can be dissolved by a surface-heating treatment which is carried out subsequently. After carrying out a washing treatment, it is preferable to remove a washing agent and the like by evaporating them, if necessary, by carrying out rinsing or drying treatment.

For the resin article after the surface-heating treatment being completed, it is preferable to directly carry out a surface-activating treatment, such as corona discharge and the like, or a primer treatment. However, if surface conditions of the resin article are not damaged, treatment such as washing and the like can be carried out. The washing treatment is effective for removing dirt or defects in surface conditions which cannot be removed by only the surface-heating treatment. For the washing treatment which is carried out after the surface-heating treatment, there can be applied a treating method almost similar to the aforementioned washing treatment which is carried out before the surface-heating treatment. However, there is avoided a treatment such as a brush roll and the like which are apt to injure a surface of the resin article.

For a washing treatment carried out before or after the surface-heating treatment, there can be optionally used various kinds of known washing agents. Since a washing agent comprising a chlorine-based solvent such as trichloroethane, flon and the like has effects of improving surface conditions of the resin article, such the washing agent is effective for improving effects of the surface-activating treatment or primer treatment. However, from a point of view on environmental protection, the use of a so-called water base washing agent including an alkaline, acidic or neutral washing agent and a nonpolar petroleum-based solvent or polar solvent such as an alcohol and the like is more preferable than the use of a washing agent comprising the above-mentioned chlorine-based solvent. For a nonpolar solvent there are cited toluene, xylene, hexane and the like. An emulsion type washing agent in which a nonpolar solvent is emulsified by a surfactant is also included in the water base washing agent. Furthermore, in the present invention, the case of using solely water or warm water is also included in the water base washing agent.

However, in case of using the water base washing agent, it is preferable to carry out rinsing or drying as the occasion demands.

The surface-activating treatment is a treatment of forming active species, which improves bonding performance to a coating, ink and the like, on the resin article surface and, for example, there are cited corona discharge, plasma treatment under vacuum or a reduced pressure, ultraviolet irradiation, or wet acid treatment by a chromic acid-mixed solution and the like. An apparatus, practical working conditions and the like to carry out the surface-activating treatment are in a category of conventional conditions. If the surface-activating treatment is carried out under conditions where the resin article has been heated up to a temperature lower than its melting point, there is a case where treatment effects are improved. However, if the surface-activating treatment is carried out under conditions where the resin article has been heated up to the melting point or a higher temperature, treatment effects are unpreferably low.

The primer treatment is a treatment comprising, to improve bonding performance between a resin article surface and a coating or ink, carrying out a washing treatment, at first, to remove oil dirt and the like, followed by coating a so-called primer before top coating or the like, which is aimed. For the primer there is used a specific primer coating suitable for each of cases according to a combination of the resin article with a top coating or ink.

For example, in the case of a polypropylene type resin-molded article, there is coated a primer containing a chlorinated polypropylene.

In the primer treatment, for a washing treatment carried out before coating a primer, similarly to the case of the aforementioned washing agents, the use of a water base washing agent is more preferable than that of a washing agent containing a chlorine-based solvent such as trichloroethane and the like. For practical washing methods, there can be applied methods similar to washing treatment in a conventional primer treatment, which comprises, for example, coating a washing agent on the resin article surface by spraying, or immersing the resin article in a washing agent. Also, in case of using a water base washing agent, rinsing or drying is carried out after the washing. In addition, after such the washing treatment, the aforementioned coating of a primer may be carried out.

For the resin article after a surface-activating treatment or a primer treatment being completed, it is preferable to directly carry out an aimed process such as coating, printing, adhering and the like. To a process of coating and the like there can be applied a treating apparatus and a treating method for a conventional thermoplastic resin article.

In the surface-heating treatment, a surface layer of a thermoplastic resin article is heated to melt. Even if there exist fine flaws or unevenness, when a surface layer of the resin article is heated to melt, the fine flaws or unevenness becomes homogeneous and a relatively smooth surface is formed. Even if dirt by a solvent and the like attach to the resin article surface, volatile or thermally decomposable dirt is removed by evaporation with heating. Even if there locally exists a fragile and weak part, which is called WBL, having composition or structure different from other parts on the resin article surface, leveling or homogenization of the composition and structure occurs by heating for melting, so that the local WBL disappears.

As a result of such effects, the resin article which has been subjected to the surface-heating treatment shows considerable decrease in defects such as flaws, sanding traces, dirt, WBL and the like which are factors of damaging surface conditions. As a result, in case of carrying out a surface-activating treatment, such as corona discharge and the like, or a primer treatment, effects of these treatments are obtained very well on the whole surface of the resin article, so that much improvement in coating performance, printability or adhesiveness of the resin article is attained.

Furthermore, the surface-heating treatment needs to be applied to only the surface layer of the resin article. The reason is as follows. Since only a surface and an underlying thin resin layer just below this surface affect the surface conditions of a resin article, even if heating for melting is applied up to a part deeper than the surface and resin layer, aimed operation effects do not enhance any more. Furthermore, if heating for melting is applied up to the resin article surface as well as a part deeper than this surface there occurs a problem that the resin article changes its shape as a whole, or that, in case of a thin sheet type article, the thickness locally varies or a hole forms.

Especially, in the case where the resin article is an article molded by injection molding and the like, residual stress is generated in the molded article and, if the resin article surface as well as a part deeper than the resin article surface are melted by heating, changing the shape of the molded article becomes very much by the above-mentioned residual stress.

Next, it is required to carry out the surface-activating treatment or the primer treatment after completion of the surface-heating treatment, that is, after the heated and melted surface layer of the resin article is sufficiently cooled with solidifying to a proper temperature which is lower than the reel ting point. This is because, if a conveying process is carried out to do the surface-activating treatment or the primer treatment under conditions that the surface layer of the resin article is melting, formation of flaws or change in the shape is easy to occur. Furthermore, if the surface-activating treatment is applied to the resin article which is in a melted condition, because active species formed on the resin article surface is taken into an inside of the resin which is in a melted condition, effects of the surface-activating treatment are diminished.

According to the above-mentioned method relating to the present invention for treating a surface of a thermoplastic resin article, it is possible to improve surface conditions of the resin article and to improve effects of the surface-activating treatment or the primer treatment by applying the aforementioned surface-heating treatment to the resin article.

As a result, it is possible to make coating performance, printability, adhesiveness and the like of the resin article excellent.

In a method of the present invention there can be improved effects of the surface-activating treatment or primer treatment, even if a washing agent comprising a chlorine-based solvent such as trichloroethane, flon and the like is not used as a washing agent. Therefore, the method is superior in aspects of environmental protection or pollution prevention.

DESCRIPTION OF THE PREFERRED EMBODIMENTS

Figure 1:
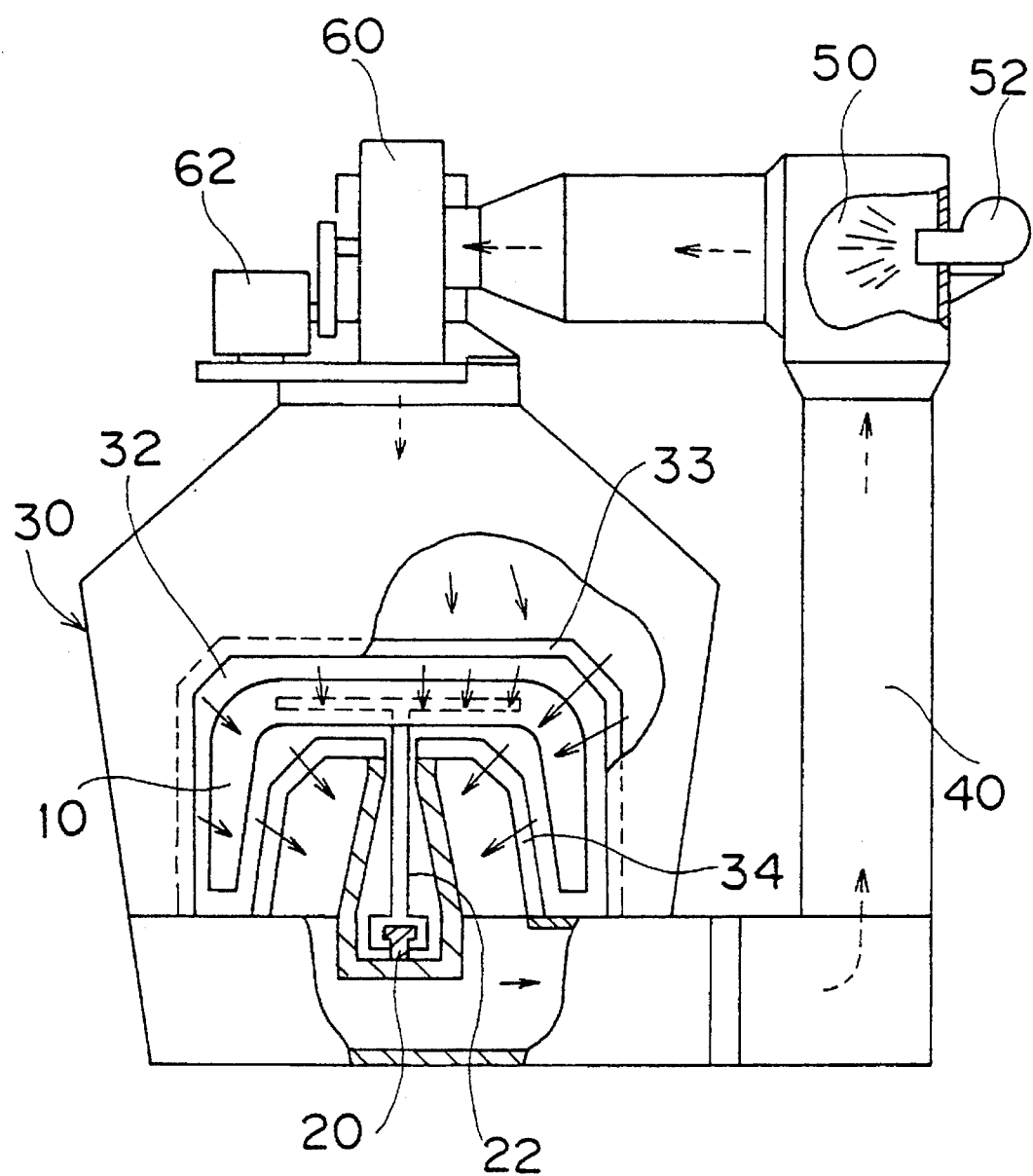
FIG. 1 is a whole structural view of a surface-heating treatment apparatus used for performing the present invention.

Next, hereinafter, the present invention is illustrated by the following examples of some preferred embodiments with referring to the drawings.

Figure 2:
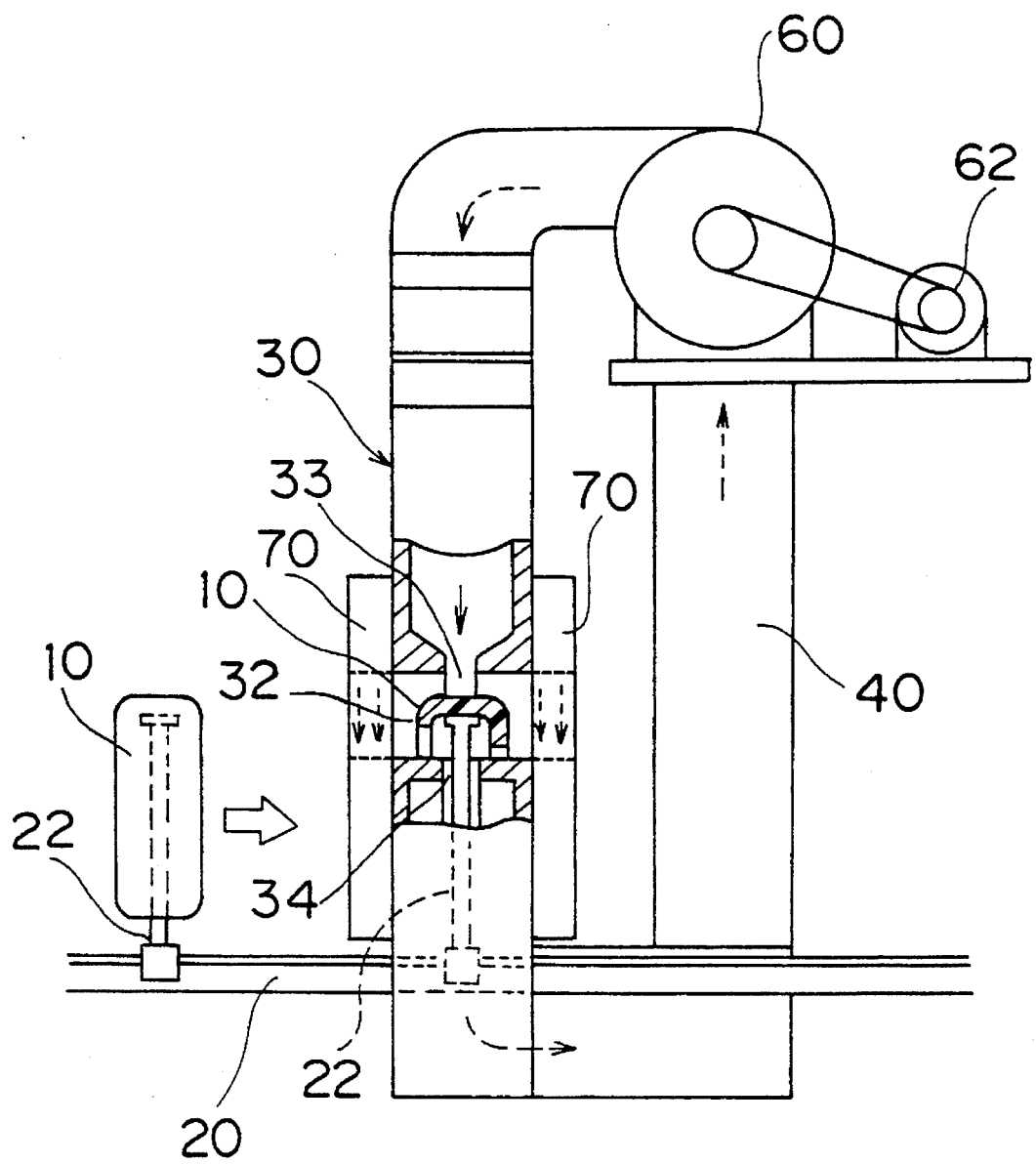
FIG. 2 is a whole structural view taken from a right side of the apparatus in FIG. 1.

FIGS. 1 and 2 show a structure of an apparatus for a surface-heating treatment used for performing the present invention.

As a thermoplastic resin article, there is used the article 10 which has been molded by injection molding of polypropylene and the like and is used as a car bumper, and a corona discharge treatment is applied to the article 10 and then, coating is carried out. The apparatus for the surface-heating treatment shown by Figs. is an apparatus to carry out the surface-heating treatment before applying the corona discharge to the article 10.

The article 10 is supported by the supporting part 22 running on the conveying rail 20. On a running route of the article 10 there is installed the hot wind-blowing part 30 having the space 32 through which the article 10 can pass. In an upper inside face of the passage space 32 there is penetrating and formed the hot wind-blowing outlet 33 of a slit type. Slit width of the blowing outlet 33 is variable in a range of from 50 to 600 min. In a lower inside face of the passage space 32 there is penetrating and formed the hot wind-inhaling inlet 34 of a slit type similar to the above-mentioned. The arrangement and shape of the aforementioned space 32 through which the article 10 passes, and those of the hot wind-blowing outlet 33 and hot wind-inhaling inlet 34 are set so that the whole surface of the article 10 can be properly blown by a hot wind in accordance with the shape and structure of the article 10.

To the hot wind-blowing part 30 there is connected the route 40 to circulate a hot wind and, by supplying a hot wind to an upper side of the hot wind-blowing part 30, the hot wind is blown from the blowing outlet 33 into the passage space 32. A hot wind blown to the article 10 is recovered through the hot wind-inhaling inlet 34 into a lower side of the hot wind-blowing part 30. On the way of the route 40 to circulate a hot wind, there is installed the combustion furnace 50 equipped with the gas burner 52 which burns LPG and the like, and inside the furnace 50 a hot wind is generated. Furthermore, on the way of the route 40 to circulate a hot wind, there is installed the circulating fan 60 which compulsively circulates a hot wind, and the circulating fan 60 is driven by the motor 62 and the like. Temperature and wind speed of the hot wind can be regulated by controlling the wind-feeding amount of the circulating fan 60 or the power of the gas burner 52. Furthermore, the conditions of a surface-heating treatment for the article 10 can be also varied by a conveying speed of the article 10. If a temperature sensor or a wind speed sensor is set near the blowing outlet 33 of the hot wind-blowing part 30 or near the article 10, the circulating fan 60 and the like can be automatically controlled on the basis of information obtained from the sensors.

Since a hot wind of high temperature passes through a route running from the combustion room 50 on the route 40 to circulate a hot wind to the blowing outlet 33 of the hot wind-blowing part 30, it is preferable to apply a heat-resistant material such as rock wool and the like to an inside face of the route 40 to circulate a hot wind as well as an inside face of the hot wind-blowing part 30 or an outside face or both faces.

As shown in FIG. 2, in the hot wind-blowing part 30, the air-curtain apparatuses 70 and 70 are installed on a front face and a back face of the passage space 32 through which the article 10 passes. The air-curtain apparatuses 70 and 70 ventilates air of normal temperature from an upper side to a lower side so that a hot wind does not escape outside. Furthermore, there is an effect with which the article 10, of which surface has been heated and melted by a hot wind, is rapidly cooled by ventilation which the air-curtain apparatuses 70 and 70 causes.

For an apparatus for the surface-heating treatment of a car bumper as described in the above example, preferable apparatus performance shows a hot wind-blowing temperature variable in a range of 200° to 600° C., a blowing wind speed variable in a range of about 5 to 40 m/sec, and a conveying speed of the article 10 variable in a range of about 1.5 to 15 m/min.

In an apparatus for the surface-heating treatment in the above-described example, when the article 10 is conveyed to the passage space 32 of the hot wind-blowing part 30 by a conveying means, a hot wind is blown on the surface of the article 10 and the surface layer of the article 10 comprising a thermoplastic resin is heated and reel ted. When the article 10 finishes passing through the passage space 32, the surface layer of the article 10 is cooled and solidified by ventilation-cooling which the air-curtain apparatus 70 causes as well as by heat radiation-cooling in the outside space. Accordingly, the surface-heating treatment is applied to the article 10.

The article 10 of which surface layer has been cooled and solidified runs on the conveying rail 20 and it is conveyed into an apparatus for a corona discharge treatment. To the structure and treatment conditions of an apparatus for corona discharge there are applied known apparatus and a known treatment conditions. Therefore, detailed explanation is omitted.

Next, there are explained more practical examples to which a surface-treating method of the present invention is applied.

EXAMPLE 1

To test pieces of thermoplastic resin articles there were applied a surface-treating method of an example of the present invention and a surface-treating method of a comparative example according to the conventional art, and then coating was carried out to evaluate the performance of resultant coating films.

Test pieces

Polypropylene type resin material plates for a car bumper (150×60×3 mm).

(Materials 1 to 5 used were commercially available bumper materials made by companies, which included materials for a hard bumper and a soft bumper. Each melting point of the materials was as follows: about 130° C. for the material 1, about 140° C. for the material 2, about 150° C. for the material 3, about 160° C. for the material 4, about 170° C. for the material 5.)

Flawing

Fine flaws were made by three times of light wiping in on the surfaces of test pieces dry conditions using commercially available gauze.

Surface-heating treatment

A hot wind processing instrument PLAJET PJ-206A (made by ISHIZAKI ELECTRIC MFG. CO., LTD., 100 Volt, 1 kw, warmest wind temperature 400° C.) was used. Hot wind was blown to a test piece surface by the hot wind processing instrument to heat and melt only a surface layer, and then the layer was cooled and solidified by heat radiation-cooling. Practically, an interval between the test piece surface and a hot wind-blowing outlet of the processing instrument was set at about 1 to 2 cm to transfer the test piece surface by hand. A period of time for the treatment is about 5 seconds. It could be confirmed by a change of color, luster or gloss on the surface that the surface layer of test piece had been heated and melted.

A similar procedure was carried out by attaching a temperature-indicating label to another test piece to find a discolored temperature-indicating label at a temperature of 190° to 200° C. Furthermore, a resident point thermometer was placed at a distance of 2 cm from a blowing outlet of the hot wind processing instrument, whereby the thermometer indicated a temperature of 200° to 230° C. In measuring a wind speed, it was in a range of 8 to 14 m/sec.

Corona discharge treatment

On a counter-electrode there was placed an acrylic plate (20 mm thickness) which was a dielectric. On the plate there was arranged a test piece, and a discharge electrode was arranged at an interval of 5 cm above the counter-electrode to apply a high voltage pulse having a pulse wave height of about 40 kv, a pulse width of about 1 μs at a repeating frequency of about 70 pps for about 30 seconds. A more practical method and apparatus used for such the corona discharge were carried out according to the method disclosed in the specification of Japanese Patent Application No. heisei 4-150904 which had been applied by the present assignee et al. and of which U.S. counterpart is U.S. patent application Ser. No. 08/072,988.

Coating process and peeling test of costing films

Coating was carried out for a test piece which had been treated by corona discharge. As a top coating there was used R-271 (two-liquid curing type urethane top coating) made by NBC Co., Ltd., which was coated according to a conventional method and then, dried. The drying was carried out at 90° C. for 40 minutes. The coated test piece was allowed to stand in a static condition for 24 hours, and then a 180° peeling test was carried out to measure the peeling strength of the coating film. The peeling test was carried out at a coating film width of 10 mm and a tensile speed of 50 mm/min by using TENSILON PTM-50 made by Orientec Corporation.

COMPARATIVE EXAMPLES

For COMPARATIVE EXAMPLES, a coating film-peeling test similar to the above-mentioned was carried out for both of the case of carrying out the corona discharge treatment without carrying out the surface-heating treatment of present invention and the case of carrying out the corona discharge treatment after carrying out a washing treatment by trichloroethane (TCE). The COMPARATIVE EXAMPLES were compared with the EXAMPLE of present invention.

(Washing treatment by TCE)

Washing for 30 seconds by trichloroethane (TCE) vapor of 80° C. was repeated 2 times.

In Table 1 are shown test results.

TABLE 1

|  | Flaws by gauze | EXAMPLE 1 Surface-heating treatment | COMPARATIVE EXAMPLE 1.1 No pre-washing | COMPARATIVE EXAMPLE 1.2 Washing treatment by TCE |
| --- | --- | --- | --- | --- |
| Material 1 | Yes | No peeling-off | 0.3 | 0.5 |
|  | No | 0.8 | 0.6 | 0.5 |
| Material 2 | Yes | No peeling-off | 0.2 | 0.9 |
|  | No | No peeling-off | No peeling-off | 0.9 |
| Material 3 | Yes | No peeling-off | 0.3 | 0.4 |
|  | No | 1.6 | 1.1 | 0.5 |
| Material 4 | Yes | No peeling-off | 0.2 | 0.6 |
|  | No | No peeling-off | 0.8 | 0.8 |
| Material 5 | Yes | 1.7 | 0.5 | 1.0 |
|  | No | 1.8 | 1.3 | 0.9 |

(In EXAMPLE and COMPARATIVE EXAMPLES, corona discharge was carried out after the process shown in this Table.)
Peeling strength unit: kg/cm As seen in the above results, in both cases of the test piece, to which flaws were made beforehand, and the test piece having no flaws, the EXAMPLE (surface-heating treatment) of present invention showed the improved peeling strength compared with COMPARATIVE EXAMPLE 1.1 (no pre-washing). Furthermore, in COMPARATIVE EXAMPLE 1.2 (washing treatment by TCE) there is a case where the peeling strength was improved compared with the COMPARATIVE EXAMPLE 1.1, however, effects of EXAMPLE of the present invention on improving the peeling strength much superior.

Figure 3:
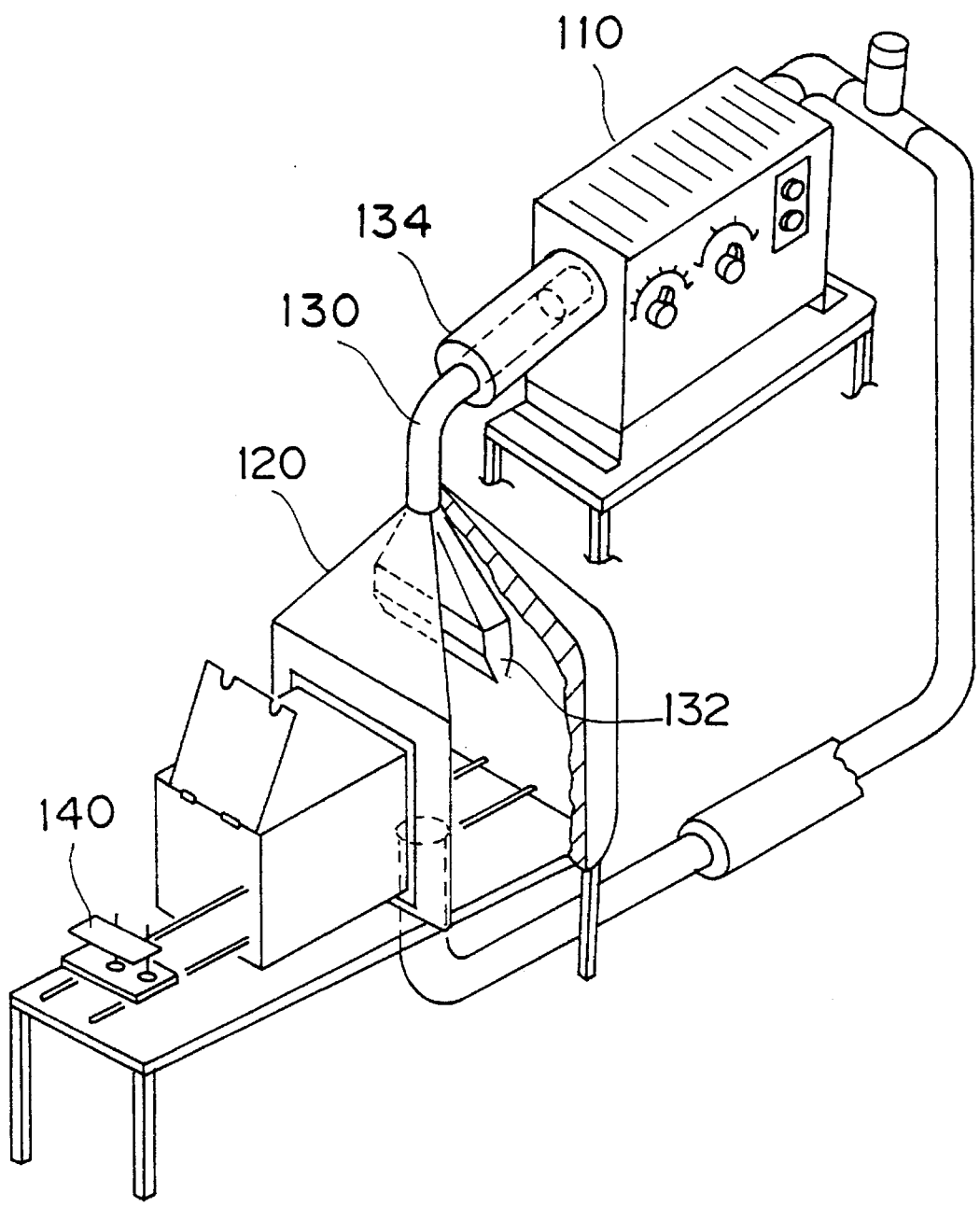
FIG. 3 is a perspective view of a surface-heating treatment apparatus showing another example.

EXAMPLE 2 an apparatus and treatment conditions applied for the surface-heating treatment were changed. The treating apparatus shown in FIG. 3 was used. As the hot wind generator 110 there was used a hot dryer SHD-8 (200 Volt, 3 φ, 8 kw, wind amount 7.0 m³/min-60 Hz, emitting wind-temperature 300° C., temperature for continuous use 250° C.) made by Suiden Co., Ltd. A hot wind generated by the hot wind generator 110 was circulated into the treating box 120 to which an adiabatic material was arranged. On the way of the circulating route 130 running from the hot wind generator 110 to the treating box 120 there was arranged the after-heater 134. A tip end of the circulating route 130 was the slit type blowing outlet 132 of 2 cm in slit width positioned inside the treating box 120. A hot wind was blown to the test piece 140 while causing the test piece 140 to fluctuating it in a direction vertically crossing the slit type blowing outlet 132. A hot wind temperature at the blowing outlet 132 could be raised up to about 400° C. by the after-heater 134. A fluctuating speed of the rest piece was about 3 cm/sec. A distance between the blowing outlet 132 and the surface of test piece 140 was about 2 cm. A wind speed measured near the blowing outlet 132 was in a range of 7 to 8 m/sec. Measurement of the wind speed was carried out by using CLIMOMASTER MODEL6511, made by Nihon Kagaku Kogyo Go., Ltd., under conditions where the temperature was not raised.

As the test piece, there was used a M4800 test piece (polypropylene type, melting point of about 160° C.), on which flaws were made in a manner similar to EXAMPLE 1. Other treatment conditions such as the corona discharge and the like were similar to those in EXAMPLE 1.

A treatment was carried out by changing variously a period of time and a temperature for applying the hot wind-blowing and results were evaluated by the peeling test similarly to the case of EXAMPLE 1. In Table 2 are shown measurement results.

B: A flat part near the terminal part on a lower face in a condition of setting front bumper.

C: A terminal part on a lower face in a condition of setting a rear bumper.

D: A terminal part of a double structure part on an upper face in a condition of setting a rear bumper.

E: A flat part on an upper face in a condition of setting a rear bumper.

For the article subjected to washing by water before carrying out the surface-heating treatment and for the article subjected to washing by an alkali before carrying out the surface-heating treatment, similar sites A to E were respectively evaluated similarly. Furthermore, for comparison, the article subjected merely to washing by water and the article subjected merely to washing by an alkali were evaluated similarly. For the washing by an alkali there was used an aqueous solution composed of sodium phosphate (0.5% concentration) and a surfactant (0.025% concentration).

TABLE 2

|  | Hot wind temperature °C. | Time for hot wind-blowing | | | | |
| --- | --- | --- | --- | --- | --- | --- |
|  |  | 1 second | 2.5 seconds | 5 seconds | 10 seconds | 20 seconds |
| COMPARATIVE EXAMPLE 2.1 | 100 | 0.2 | 0.2 | 0.2 | 0.3 | 0.3 |
| COMPARATIVE EXAMPLE 2.2 | 150 | 0.2 | 0.3 | 0.3 | 0.2 | 0.3 |
| EXAMPLE 2.1 | 200 | 0.4 | 0.5 | 0.7 | 0.7 | 0.8 |
| EXAMPLE 2.2 | 250 | 0.4 | 0.8 | 1.0 | 1.2 | 1.4 |
| EXAMPLE 2.3 | 300 | 0.8 | 1.0 | 1.1 | 1.3 | *** |
| EXAMPLE 2.4 | 400 | 1.0 | 1.4 | *** | *** | *** |

(In EXAMPLES and COMPARATIVE EXAMPLES, corona discharge was carried out after the process shown in this Table.)
Peeling strength unit: kg/cm
***: Since the test pieces very much changed their shapes, measurements could not be done.

As seen in the above test results, it is understood that effects on improving the peeling strength vary with the hot wind temperature and hot wind-blowing time. Although these vary according to other treating conditions, it is usually found as preferable to blow a hot wind at a temperature of 250° to 300° C. for about 2.5 to 10 seconds. It was also found that, if the rest piece fluctuates with blowing a hot wind, the whole surface of the test piece underwent an uniformly heating and melting. If fluctuation conditions of the test piece vary, effects are very different. Therefore, it is preferable to fluctuate properly according to the structures of a thermoplastic resin article, a hot wind-blowing outlet and the like.

EXAMPLE 3

Figure 4A:
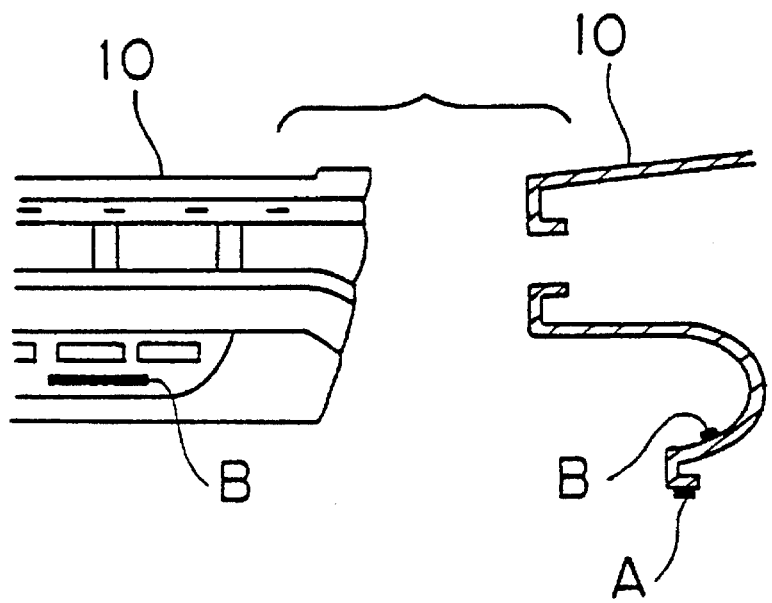
FIG. 4 shows the sites measured in a test for comparing performance. The (a) is a schematic view showing a front bumper, and the (b) is a schematic view showing a rear bumper.
Figure 4B:
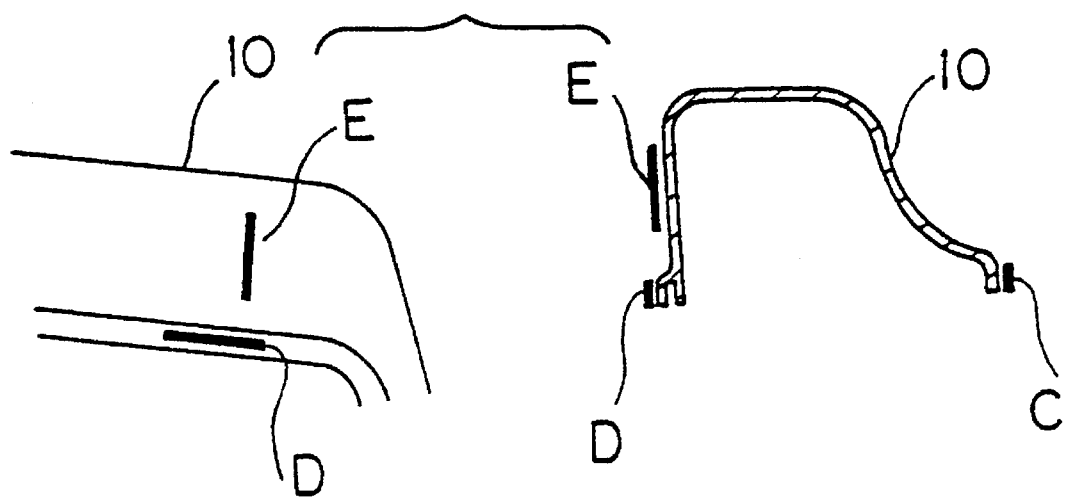

A test piece was not used, but an article which had been molded by injection molding and is to be practically used for a car bumper (such as obtained by leaving a bumper in a laboratory for 6 months followed by cutting it into pieces, of which melting point was about 160° C.) was used. Intentional flawing by gauze and the like was not carried out. Concerning other conditions such as corona discharge and the like, there were carried out treatments and an evaluation test in manners similar to EXAMPLE 1. The peeling strength was measured at plural sites (five sites of from A to E shown in FIG. 4) of the article.

A: A terminal part on a lower face in a condition of setting a front bumper.

Treating conditions for the washing by an alkali were at 60° C. for 20 seconds and then, rinsing and drying were carried out after the washing by an alkali.

In Table 3 are shown test results.

TABLE 3

|  | Treating method | Measured sites | | | | |
| --- | --- | --- | --- | --- | --- | --- |
|  |  | A | B | C | D | E |
| COMPARATIVE EXAMPLE 3.1 | Washing by water | 0.3 | 0.5 | 0.2 | 0.2 | 0.5 |
| COMPARATIVE EXAMPLE 3.2 | Washing by alkali | 0.3 | 1.0 | 0.7 | 0.8 | No peeling |
| EXAMPLE 3.1 | Washing by water + Surface-heating | No peeling | No peeling | No peeling | 1.4 | 1.4 |
| EXAMPLE 3.2 | Washing by alkali + Surface-heating | No peeling | No peeling | No peeling | No peeling | 2.1 |

(In EXAMPLES and COMPARATIVE EXAMPLES, corona discharge was carried out after the process shown in this Table.)
Peeling strength unit: kg/cm
"No peeling" means that peeling-off did not occur under the test conditions.

As seen in the above test results, when only the washing by an alkali was carried out, there were observed sites where the peeling strength was improved and sites where the peeling strength was not much improved, depending upon the sites on the article. In contrast, when the washing by an alkali was combined with the surface-heating, good results were attained at all sites.

EXAMPLE 4

After the surface-heating treatment, primer coating followed by top coating were carried out. As the primer there was used a primer RB-123M of an exclusive use for PP, made by NBC Co., Ltd., and as the top coating there was used a top coating R-271 made by NBC Co., Ltd. The corona discharge treatment was not carried out. Other treating conditions were similar to the case of making flaws in EXAMPLE 1. Furthermore, comparison was carried out with the case of carrying out a washing treatment by TCE in place of the surface-heating treatment. As a material there was used a material similar to that used in EXAMPLE 1.

In Table 4 are shown test results.

TABLE 4

|  | EXAMPLE 4 Surface-heating treatment | COMPARATIVE EXAMPLE 4.1 No pre-washing | COMPARATIVE EXAMPLE 4.2 Washing treatment by TCE |
| --- | --- | --- | --- |
| Material 1 | 0.7 | 0.4 | 0.6 |
| Material 2 | 1.0 | 0.5 | 0.8 |
| Material 3 | 1.2 | 0.8 | 0.8 |
| Material 4 | 0.7 | 0.4 | 0.6 |
| Material 5 | 0.8 | 0.3 | 0.6 |

(In EXAMPLE and COMPARATIVE EXAMPLES, primer coating was carried out after the process shown in this Table. Corona discharge was not carried out.)
Peeling strength unit: kg/cm As seen in the above test results, it was proved that the present invention also has an effect on improving treating performance of the primer coating treatment.

EXAMPLE 5

The procedure of EXAMPLE 1 was repeated except that as the surface-activating treatment there was carried out an ultraviolet-irradiation treatment (an UV treatment) in place of the corona discharge.

UV treatment

Using a low pressure mercury lamp (made by Sen Light Corporation) was used and a distance between the lamp and a surface of a test piece was set at 3 cm to carry out the ultraviolet irradiation for 60 seconds.

Other treating conditions were similar to the case of the test piece in EXAMPLE 1 on which flaws were made. Is a material there was used the material 3 of EXAMPLE 4.

As a result, although the peeling strength was 80 g/cm in case of not carrying out the surface-heating treatment, it was 750 g/cm in case of carrying out that, showing much improvement. From the result, it was proved that the present invention also has an effect on improving performance of an ultraviolet- irradiation treatment.

EXAMPLE 6

The treating apparatus as shown in FIG. 1 was used and there was carried out the surface-heating treatment of a car bumper having a practical three-dimensional shape.

The bumper used for a test was commercially available one for a car, and it contained a polypropylenepolyethylene copolymer as a main component, was such as made by combining ethylene-propylene rubber in a ratio of 5% by weight with the copolymer (a melting point of the bumper was about 170° C. ). Although the thickness of the bumper was about 3 mm mostly, on its reverse side there was a reinforcement, and a t radiator grill part of the bumper there were ribs having thickness of 1 mm. Therefore, it was required to carry out the surface-heating so as not to overmelt the ribs.

The conveying speed of the bumper was changed to a range of 3.5 to 8 m/min. The slit width of the hot windblowing outlet was changed to a range of 40 to 500 mm. Thereby the treating time could be changed to a range of 0.3 to 5 seconds. The temperature at the hot wind-blowing outlet was changed to a range of 200° to 600° C. The wind speed at the hot wind-blowing outlet was in a range of 15 to 30 m/sec.

After the above-mentioned treatment by a hot wind (surface-heating treatment), cooling was carried out and then a corona discharge treatment was carried out. In the corona discharge treatment there was used an apparatus disclosed in the specification of Japanese Patent Application No. heisei 4-152059 which had been applied by the present assignee et al. and of which U.S. counterpart is U.S. patent application Ser. No. 08/072,988. Discharge conditions were an interelectrode distance of 40 cm, a discharge voltage of 240 KV (an electric field strength of 6 KV/cm) and a discharge time of 5 minutes. A coating used in a coating process, conditions in a drying process, and a method for the coating filmpeeling test were similar to those in EXAMPLE 1.

Figure 5:
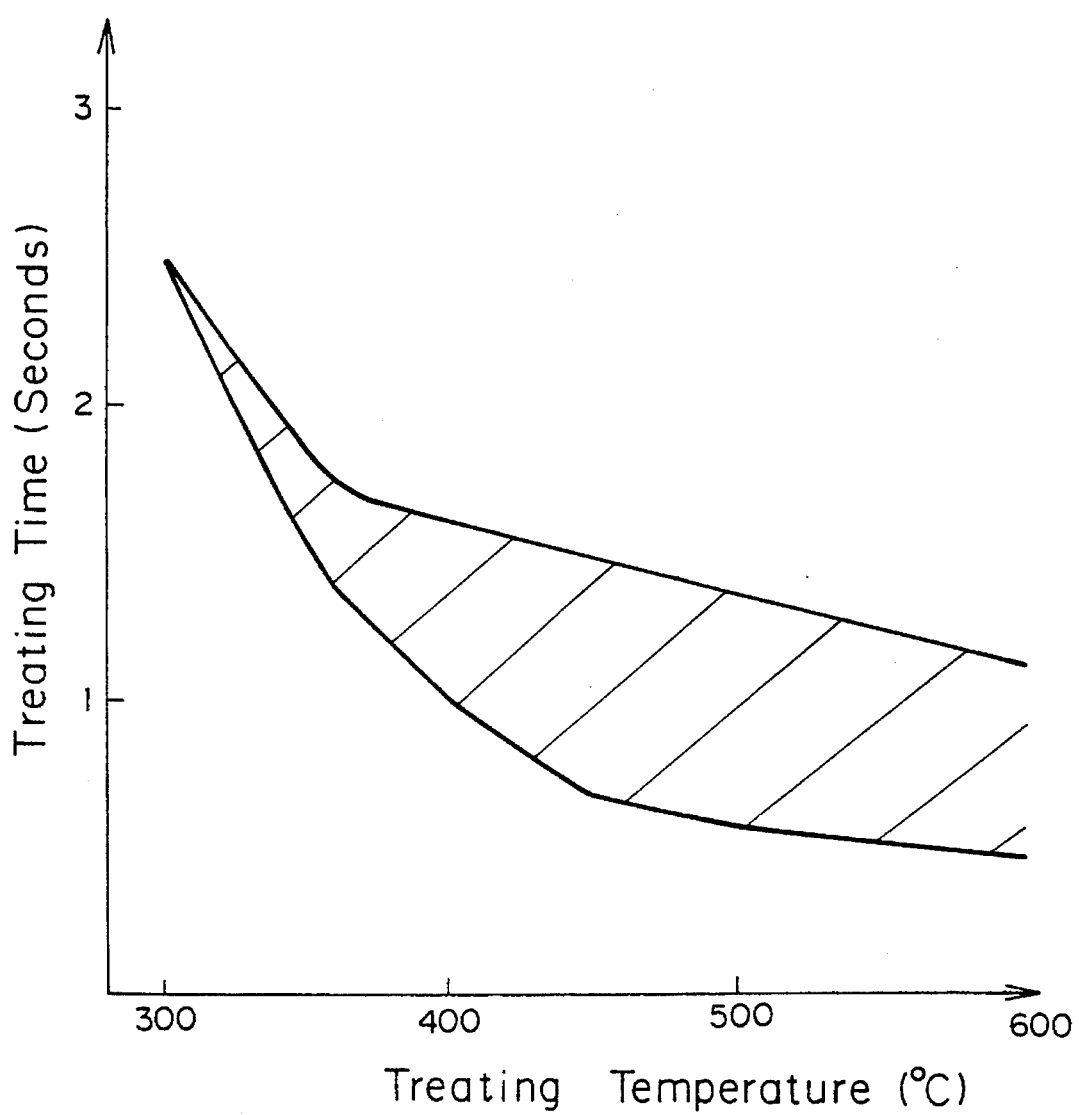
FIG. 5 is a graph showing one example of preferable treating conditions in carrying out the surface-heating treatment according to the present invention.

Results are shown in FIG. 5. It is clear from the FIG. 5 that it is the most economical to carry out the treatment in a temperature range of 360° to 380° C. for 1.5 to 1.8 seconds, but that it is also possible to carry out the treatment in a temperature range of 400° to 500° C. for a time shorter than the above.

What is claimed is:

1. A method for treating a surface of a thermoplastic resin article comprising:

carrying out for the resin article a surface-heating treatment, which comprises heating only a surface layer of the resin article up to a melting point of the thermoplastic resin or a higher temperature followed by cooling said surface layer, and thereafter carrying out a surface-activating corona treatment for the resin article, wherein the heating in the surface-heating treatment is carried out by blowing onto the resin article surface a hot wind having a temperature higher than a melting point of the resin article by 30° to 450° C., and wherein the blowing of a hot wind is carried out at a wind speed of 1 to 40 m/sec for a treating period of 0.5 to 20 seconds.

2. A method for treating a surface of a thermoplastic resin article comprising:

carrying out for the resin article a surface-heating treatment, which comprises heating only a surface layer of the resin article up to a melting point of the thermoplastic resin or a higher temperature, and thereafter coating a primer on the resin article, wherein the heating in the surface-heating treatment is carried out by blowing onto the resin article surface a hot wind having a temperature higher than a melting point of the resin article by 30° to 450° C., and wherein the blowing of the hot wind is carried out at a wind speed of 1 to 40 m/sec for a treating period of 0.5 to 20 seconds.

3. The method as claimed in claim 1 or 2, wherein washing by a water base washing agent is carried out before or after the surface-heating treatment.

4. The method as claimed in claim 1 or 2, wherein the resin article is an article molded by injection molding.

5. The method as claimed in claim 1 or 2, wherein the resin article is a sheet and, in carrying out the surface-heating treatment at one side of the resin article sheet, its reverse side is forcibly cooled.

6. The method as claimed in claim 1 or 2, wherein the resin article is a sheet and, in the surface-heating treatment, said resin article sheet is heated by applying both far-infrared irradiation and hot wind-blowing.

7. The method as claimed in claim 1 or 2, wherein the resin article is a vessel molded article and the surface-heating treatment is carried out under conditions where a liquid is filled inside the vessel molded article.

8. The method as claimed in claim 1, further comprising, after the surface-activating treatment being completed, carrying out coating onto a surface of the surface-activated resin article.

9. The method as claimed in claim 2, further comprising, after the primer being coated on the resin article, carrying out coating onto a surface of the primer-coated resin article.

10. The method as claimed in claim 1 or 2, wherein the thermoplastic resin comprises polypropylene.

11. The method as claimed in claim 1 or 2, wherein the thermoplastic resin article is a molded article having a three-dimensional shape.

12. The method as claimed in claim 2, wherein the primer contains a chlorinated polypropylene.

\* \* \* \* \*